US012649419B2

(12) United States Patent
Cannon

(10) Patent No.: US 12,649,419 B2
(45) Date of Patent: Jun. 9, 2026

(54) LOUDSPEAKER ARRANGEMENT OF A VEHICLE

(71) Applicant: International Automotive Components Group NA, Inc., Southfield, MI (US)

(72) Inventor: Carter Scott Cannon, Munich (DE)

(73) Assignee: International Automotive Components Group NA, Inc., Southfield, MI (US)

( * ) Notice: Subject to any disclaimer, the term of this patent is extended or adjusted under 35 U.S.C. 154(b) by 307 days.

(21) Appl. No.: 17/838,926

(22) Filed: Jun. 13, 2022

(65) Prior Publication Data

US 2022/0396207 A1     Dec. 15, 2022

(30) Foreign Application Priority Data

Jun. 14, 2021     (DE) .......................... 102021115348.4

(51) Int. Cl.
*H04R 7/02*       (2006.01)
*B60R 1/12*       (2006.01)

(52) U.S. Cl.
CPC ................. *B60R 1/12* (2013.01); *H04R 7/02* (2013.01); *B60R 2001/1284* (2013.01); *H04R 2499/13* (2013.01)

(58) Field of Classification Search
CPC .............. B60R 1/12; B60R 2001/1284; B60R 2001/1276; H04R 7/02; H04R 2499/13; H04R 17/00; H04R 2420/07; H04R 2440/05; H04R 7/045; H04R 1/025; H04R 1/26; H04R 1/323; H04R 1/345; H04R 2499/15; H04R 1/2834; H04R 1/028;

(Continued)

(56) References Cited

U.S. PATENT DOCUMENTS

| | | | |
|---|---|---|---|
| 6,720,708 B2 | 4/2004 | Athanas | |
| 7,038,356 B2 * | 5/2006 | Athanas ................. | H04R 17/00 |
| | | | 310/317 |

(Continued)

FOREIGN PATENT DOCUMENTS

| | | | | |
|---|---|---|---|---|
| CN | 109525915 A | * | 3/2019 | ............... H04R 1/20 |
| EP | 1938660 A1 | | 7/2008 | |
| WO | WO-0035242 A2 | * | 6/2000 | ............... H04R 7/04 |

OTHER PUBLICATIONS

Machine translation of CN-109525915-A Descirption. (Year: 2019).*

(Continued)

*Primary Examiner* — Dedei K Hammond
*Assistant Examiner* — Jennifer B Olson
(74) *Attorney, Agent, or Firm* — Secant IP, PLLS; Steven J. Grossman

(57)     ABSTRACT

A loudspeaker arrangement of a vehicle, comprises a speaker including an at least partially transparent diaphragm and a transducer coupled to the diaphragm, wherein movement of the transducer causes vibration of the diaphragm to generate sound by vibration of the diaphragm, the diaphragm having a front face directed towards an interior of the vehicle and an opposite rear face; and a carrier configured to support the diaphragm by supporting the diaphragm at its edges relative to a window glass of the vehicle such that the rear face of the diaphragm faces and is spaced from the window glass.

25 Claims, 10 Drawing Sheets

Figure 1:
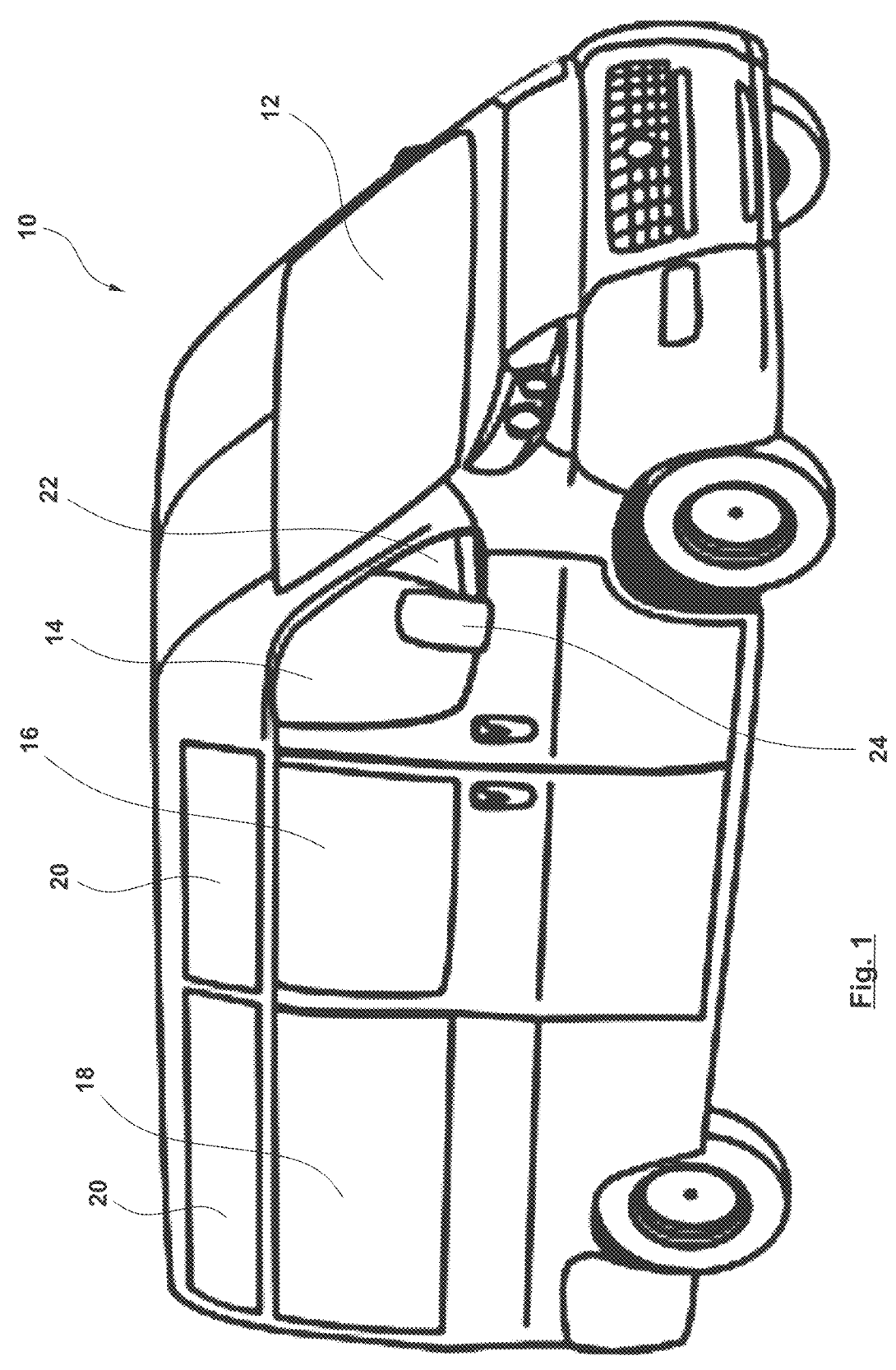

(58) Field of Classification Search
CPC ....... H04R 2440/07; B32B 7/12; B32B 17/00;
B32B 17/063; B32B 17/10; B32B 25/00;
B32B 27/00; B32B 27/306; B32B 33/00;
B32B 2250/40; B32B 2307/412; B32B
2605/00
USPC .......... 381/86, 389, 365, 302; 181/148, 199
See application file for complete search history.

(56)                    References Cited

U.S. PATENT DOCUMENTS

| | | | | |
|---|---|---|---|---|
| 7,050,593 | B1 * | 5/2006 | Emerling ................. | H04R 5/02 |
| | | | | 181/161 |
| 7,764,803 | B2 * | 7/2010 | Kang ....................... | H04R 7/04 |
| | | | | 381/388 |
| 8,180,065 | B2 | 5/2012 | Snider | |
| 10,063,953 | B1 * | 8/2018 | Majkowski ............ | H04R 1/028 |
| 10,479,300 | B2 * | 11/2019 | Wheeler ................ | H04R 17/02 |
| 11,290,807 | B2 * | 3/2022 | Akiyama ............ | H04R 1/2834 |
| 11,511,680 | B2 * | 11/2022 | Novotny ................ | H04R 1/345 |
| 11,632,628 | B2 * | 4/2023 | Akiyama ................. | H04R 7/22 |
| | | | | 181/167 |
| 11,950,035 | B2 * | 4/2024 | Lee ........................ | H04R 7/045 |

OTHER PUBLICATIONS

Olivier Mal et al., A Novel Glass Laminated Structure for Flat Panel
Loudspeakers, Audio Engineering Society Convention Paper, Pre-
sented at the 124th Convention, May 17-20, 2008 in Amsterdam,
The Netherlands, 6 pages.

* cited by examiner

LOUDSPEAKER ARRANGEMENT OF A VEHICLE

FIELD

The invention relates to a loudspeaker arrangement of a vehicle which is arranged in or on an interior component of the vehicle.

BACKGROUND

Traditionally, displays, controls and speakers are provided as separate entities in the interior of a vehicle to allow a driver and passengers of the vehicle to control operation of the vehicle and to receive feedback, information and also entertainment directed at the driver and passengers. System integration has advanced and, for example, speakers have been integrated into a headliner or provided over a video display screen, as described in U.S. Pat. Nos. 7,050,593 and 7,038,356.

There is a desire to further advanced system integration to reduce parts, decrease weight and space requirements and improve user experience.

SUMMARY

The invention provides a loudspeaker arrangement of a vehicle. Different aspects are defined in the dependent claims.

The loudspeaker arrangement comprises a speaker including an at least partially transparent diaphragm and an actuator, such as a transducer, coupled to the diaphragm, wherein movement of the transducer causes vibration of the diaphragm to generate sound by vibration of the diaphragm, the diaphragm having a front face directed towards an interior of the vehicle and an opposite rear face; and a carrier configured to support the diaphragm by supporting the diaphragm relative to a window glass of the vehicle such that the rear face of the diaphragm faces and is spaced from the window glass.

The carrier can be connected to or be part of interior component of different vehicle types, including passenger cars, trucks, trains and aircrafts. The carrier also may be connectable directly to a window glass. The diaphragm may also be referred to as an audio glass and the speaker may be referred to as a screen speaker, glass speaker, or piezoelectric speaker, as detailed further below. According to the invention, the carrier provides a support along at least part of the periphery of the diaphragm where the diaphragm is attached via a spacer extending along at least part of the periphery of the diaphragm to allow the assembly to effectively become a vibrating diaphragm. Accordingly, the front face and the rear face of the diaphragm are free off the carrier across at least part of the diaphragm surface so that the diaphragm is supported in the carrier and is free to vibrate when excited by the transducer. In this loudspeaker arrangement, the diaphragm would be the sound generator and the window glass may be a sound reflector towards the interior of the vehicle and/or a sound insulator towards the outside. This provides an effect where the diaphragm which generates the sound of the speaker is suspended or appears to be floating in front of the window glass, with no direct contact between the window glass and the sound generating portion of the diaphragm surface so that the diaphragm is free to vibrate and generate sound.

The loudspeaker arrangement locates the sound generating diaphragm in portions of the vehicle not previously used for a loudspeaker and generates an impression as if the window glass would be the speaker. This opens new opportunities of use of space in the vehicle and a new user experience. By integrating the sound generating diaphragm in an interior component, instead of using the window glass as such as a speaker, the loudspeaker arrangement is easily integrated into the vehicle and easily serviced, repaired, refitted, upgraded and/or exchanged.

In one example, the diaphragm is spaced from the window glass by a distance in the range of 2 to 200 mm, such as 2 to 60 mm or 50 to 125 mm. Providing a sufficient distance between the diaphragm of the window glass allows controlling and improving sound propagation. The distance between the diaphragm the window glass also will depend on the location and configuration of the loudspeaker arrangement.

In different examples, the diaphragm is transparent or semitransparent or can be tunable from transparent to semitransparent to opaque and/or can be permanently or controllably tinted in different colors. In at least some of these examples, the diaphragm, in addition to generating sound, can provide a controlled sunshade, controllable privacy glass and/or a controllable atmospheric window.

The loudspeaker arrangement further may include a light source provided at the carrier, behind the carrier, at the diaphragm or behind diaphragm and configured to transmit light to the front face of the diaphragm. In at least some of these examples, the diaphragm can be configured to provide an orientation or ambient or atmospheric light and/or decoration. The diaphragm also can be configured to be illuminated to display images and/or information, such as directions or advertisement related to the current location of the vehicle. The light source may comprise one or more LEDs, such as SMD LEDs. In another example, the diaphragm may cover a display or a projector, such as a micro, nano or pico projector, to provide information and/or entertainment via the diaphragm.

In various examples, the window glass is part of a nonmoving window of the vehicle, such as a front or rear vent window, a back quarter window, a back window, and a sun roof and the carrier is configured to position the diaphragm to at least partially overlap the window glass. In these examples, the loudspeaker can be positioned at any locations where, in a vehicle, a nonmoving window would be located traditionally. The window glass also may be part of a window with limited movability such as a hinged window. The loudspeaker arrangement, however, also can be located in another nontraditional area, i.e. in an area where, in a vehicle, a window traditionally would not be located. For example, a window glass can be located in a side mirror attachment area of the vehicle, in a column of the vehicle adjacent one of the side windows, or in a slide panel or door panel of vehicle below a belt line and the carrier can be configured to position the diaphragm to at least partially overlap the window glass.

The loudspeaker arrangement also may include a camera arranged at the carrier or an interior component associated with the carrier to capture images from inside or outside of the vehicle, e.g. to provide a surveillance function, or a mirror function. In one specific example, the diaphragm may be part of digital side view mirror or digital rearview mirror by combining the camera with a display function integrated with the diaphragm. In another example, the diaphragm be part of or include a touchscreen.

The diaphragm also can include a pattern formed on a surface of the diaphragm, such as a pattern created by printing, overmolding or etching. Etching may be performed by laser etching, chemical etching or water jet etching. Alternatively or additionally, the diaphragm may be at least partially covered or embedded in an encapsulation material. The patterning of the diaphragm's surface may be provided the decorative, functional and/or acoustic effects. For example, icons and symbols can be printed on the outer face of the diaphragm to provide an indication to a user.

In this or other examples, the surface of the diaphragm may be structured to manipulate sound waves emitted from the diaphragm towards the interior of the vehicle and/or towards the window glass. For example, the surface may be structured to selectively resonate, reflect, divert, scatter, direct and/or focus sound waves. Further, the surface may be structured as a sound board. Accordingly, the surface of the diaphragm, optionally in combination with the surface of an opposite window glass, can be designed to capture, shape and reflect the sound generated at the diaphragm.

Also the surface of the window glass facing the diaphragm may be structured to manipulate sound waves emitted from the diaphragm towards the window glass. Accordingly, at least one of the surfaces of the diaphragm and the surface opposite to the rear face of the diaphragm is structured to manipulate sound waves emitted from the diaphragm towards the surface and reflected to the interior vehicle cabin. For example, the at least one surface is structured to selectively resonate, reflect, divert, scatter, direct and/or focus sound waves. Further, the at least one surface may be structured as a sound board.

The carrier may comprises a frame to support the diaphragm. In one example, one or more gaps are formed between an outer carrier and the frame with the diaphragm supported by the frame so that sound waves can exit from behind the diaphragm through the gap(s) and into the vehicle cabin to enrich the sound generated by the loudspeaker.

In this example, the frame may include ribs which function as sound directing vanes and which extend from an inner perimeter of the carrier to the outer perimeter of the frame supporting the diaphragm to create sound directing channels for transmitting the sound from behind the diaphragm into the vehicle cabin.

The loudspeaker arrangement further may comprise a wireless communication component to allow communication between a sound source or transmitter of the vehicle and an actuator or transducer of the loudspeaker arrangement. This facilitates refitting a vehicle with the loudspeaker arrangement, as well as mounting, replacing and servicing the loudspeaker arrangement. The carrier may include fastening elements to attach the carrier directly to the window glass. This also facilitates refitting a vehicle with the loudspeaker arrangement, as well as mounting, replacing and servicing the loudspeaker arrangement.

In another example, the window glass may be part of the loudspeaker arrangement wherein the diaphragm at least partially overlaps the window glass. In this example, the carrier may be configured to support the window glass and may be configured to be attached directly to a body-in-white structure of a vehicle, e.g. via clips, in-mold clips and/or threaded fasteners. This also facilitates refitting a vehicle with the loudspeaker arrangement, as well as mounting, replacing and servicing the loudspeaker arrangement.

A number of loudspeaker arrangements may be placed in different locations of the vehicle, associated with different windows or window portions. As a result, the loudspeaker arrangements allow tuning and directing the sound generated by the diaphragms in a way not yet known for conventional speakers or glass speakers used in automotive applications. Additionally, the diaphragm can be supported in the carrier to be suspended in front of the window glass, with minimum visible reinforcement or support by the carrier and with a free space between the diaphragm the window glass. The free space behind the diaphragm may be visible behind the clear diaphragm so that the diaphragm may appear as a second window pane in front of the window glass. In addition an ambient or functional orientation light or a display can be integrated with the diaphragm of the loudspeaker arrangement, as mentioned above.

The carrier may be a single or multi-part and single or multi-layer component, for example. The diaphragm may be attached to the carrier or sandwiched between two carrier portions, also referred to as carrier and frame, with sealing and spacer strips sandwiched there between, e.g. using clips, hooks, threaded screws or similar to support the diaphragm to be able to vibrate with in the carrier. The transducer will be attached to the surface of the diaphragm and can be wired within the carrier, visible to or hidden from view of a passenger of the vehicle. The transducer also may be coupled to a wireless communication device. The window glass also can be supported by the carrier and the carrier, including the diaphragm the window glass, can be attached to the body of the vehicle; or the window glass can be installed in the body of the vehicle in a traditional way and the loudspeaker arrangement, including the carrier and the diaphragm, can be attached to the vehicle body or an interior component surrounding the window glass or to the window glass directly to associate the loudspeaker arrangement with the window glass and keep a designed distance to the window glass.

As mentioned above, the diaphragm may be attached to the carrier via a gasket or other seal and/or a spacer. For example, a sealing and spacer foam, such as a double sided sealing foam adhesive tape and/or bonding tape may be preassembled to the carrier or the diaphragm wherein the sealing tape may be provided at the rear side of the carrier around the perimeter of an opening for receiving the diaphragm. The fact that the diaphragm is not directly attached to the carrier but via a seal and spacer gasket, for example, enhances the capability of the diaphragm to vibrate and move freely.

In one or more embodiments, one or more transducers are coupled to the diaphragm at a surface portion of the diaphragm where the carrier covers the front face of the diaphragm so as to hide the transducer from being perceived by the passenger of the vehicle. In particular, the transducer may be offset from the center of the diaphragm, e.g. to a lower or upper or sideways ⅓ area of the diaphragm and hidden behind the carrier. Accordingly, the transducer may be arranged at a surface portion of the diaphragm, which is offset from the center of the diaphragm surface towards an edge of the diaphragm and/or the center of the transducer may be arranged at a surface position of the diaphragm which is closer to the edge of the diaphragm surface than to the center of the diaphragm surface. Experiments have shown that this still achieves a remarkably good sound performance. By locating the transducer outside the visible portion of the diaphragm, the clear surface of the diaphragm is unobstructed and also the view through diaphragm and the window glass is an obstructed.

As indicated above, the transducer may be communicatively coupled to a sound source of the vehicle by a wireless communication component. The sound source may be a media player, radio or the like. The wireless communication component may use Bluetooth, ZigBee, Z-Wave, WLAN or other suitable communication technology.

Additionally, the diaphragm can be used to illuminate, decorate or add additional design features without the presence of the transducer and associated wiring. The diaphragm also may be provided over the front face of a transparent or semitransparent display such as a digital side view or rear view mirror.

Also the transducer may be attached to the diaphragm by a foam seal and spacer gasket, e.g. in a portion of the diaphragm which lies inside or outside of the perimeter of an opening provided in the carrier for exposing the diaphragm. The transducer may be arranged at a flat surface portion of the diaphragm to assure a reliable and complete transmission of the transducer's motion to the diaphragm. The transducer together with the attachment seal and the associated portion of the diaphragm should both be as flat as possible to have a consistent surface attachment without gaps there between.

The transducer may be a piezoelectric exciter including a wire harness and connected or to be connected to a wiring in the carrier or an interior component associated with the carrier. The transducer also may be connected to a wireless communication device. The transducer and the diaphragm in combination, in an embodiment, are part of a piezoelectric speaker which is a loudspeaker that uses the piezoelectric effect for generating sound. The initial mechanical motion is created by applying a voltage to a piezoelectric material, and this motion is converted into audible sound using the diaphragm and optional resonators. Compared to other speaker designs piezoelectric speakers are relatively easy to drive; for example they can be connected directly to TTL outputs, although more complex drivers can give greater sound intensity. The speaker can be designed to operate in a frequency range of, for example, 500 Hz to 20 KHz.

Different loudspeaker arrangements designed for different frequency ranges may be located at different positions within the vehicle. For example, in an upper region of the vehicle, such as at a sunroof or back window or quarterback window, a tweeter or treble speaker can be implemented which is a type of loud speaker designed to generate sound in a higher frequency range, such as 2 kHz to 20 kHz. In a lower region of the vehicle, such as a front vent window or in a side panel or door panel vehicle, a bass speaker or woofer design can be implemented which is a type of loud speaker having an additional acoustic chamber designed to generate sound not (only) on the diaphragm but in the resonating chamber in a lower frequency range, such as 500 Hz to 1 kHz. In a middle region of the vehicle, such as in a side mirror attachment region, an all-round speaker design can be implemented which can be designed to generate sound in a middle frequency range, such as 1 kHz to 2 kHz. The loudspeaker arrangement of this invention also can be combined with more traditional speakers, integrated into interior components at other locations than in front of a window glass.

During movement of the diaphragm, the diaphragm creates an air pressure wave in front and at the backside of the diaphragm. A forward movement will create a slight overpressure at the front face and a slight under-pressure at the rear face and vice versa. It is therefore an option that the front and backside are acoustically isolated from each other to avoid air pressure cancellation and consequently a serious reduction of the sound output.

Using different designs, the diaphragm may be arranged and/or shaped to generate sound waves having a center of propagation directed at an area within a vehicle cabin which is located in front of and adjacent to a specific passenger head rest. In particular, the surface of the diaphragm may be positioned or designed to project, radiate and/or focus sound in a particular direction, such as the likely position of the head and ears of the driver or a specific passenger.

The design may be generated with CAE/CAD software specifically to generating an optimized surface and shape to modify the sound, increase range, direct and focus the sound i.e. within a specific personal passenger zone, e.g. to obtain or prove a high/Tweeter range at a drivers or passengers head/ears, or in combination with other speakers offer individualized audio within a defined zone. The diaphragm may be designed, for example, with the use of a Finite Element Sound Analysis design/engineering software program. For example, the design of the diaphragm and/or the opposite surface can be generated in such a way that sound would not be audible or would be less audible to some vehicle passengers offering a personalized listening experience.

In different examples, the diaphragm is flat, 2.5D shaped or 3D shaped. A 2.5D shape may relate to a shape in which a surface is curved or three-dimensionally shaped in a single direction but flat in other directions/planes, similar to a cylinder or a cylinder section. A minimum bending radius of a curved shape may be in the order of 150 mm. One example of a 2.5 D diaphragm may be glass structure which is flat over a major part of its surface but is curved at the edges or which has a cylindrical shape with the cross section of a partial circle or a parabolic cross-section.

A flat 2D diaphragm would have a general dispersion of sound which is to the cabin interior. For example, the diaphragm surface center may be directed or angled at and facing a driver or passenger. This can be for both mid and high frequency range speaker locations on an interior trim part, such as a door trim part, for example. A shaped 2.5D diaphragm may be angled further to focus and/or manipulate the sound where desired in the interior cabin. A fully 3D shaped diaphragm provides even more options to improve and engineer the sound within the interior. A molded 3D diaphragm may offer further design features with the diaphragm shape that might improve the performance and acoustic effects.

Depending on the manufacturing process of the diaphragm, different bending radii may be provided. In one example, the diaphragm is formed by cold forming glass sheets having a bending radius of at least 150 mm in any region thereof. Either outer glass sheets or the entire multilayer diaphragm may be shaped by cold forming.

In another example, the diaphragm is formed by hot forming glass sheets having a bending radius of at least 15 mm in any region thereof. Bending radii are observed to avoid breaking, shattering or cracking. In still another example, the diaphragm is formed by molding having any desired bending radius wherein clear layers are formed from a polymer material.

In one or more embodiments, the diaphragm may have an overall thickness of between 0.5 mm and 2 mm, in particular less than 2 mm, or about 0.7, 1 or 1.5 mm. Further, the diaphragm may be a multi-layer structure comprising a clear damping layer positioned between to clear outer glass layers. A diaphragm entirely formed by molding from a polymer material may have a larger thickness of up to 4 mm, for example.

In one specific example, the diaphragm comprises a sandwich construction consisting of two approximately 0.5 mm thick tempered sheets of glass that are laminated to a PVB, EVA or another polymer interlayer with the interlayer sandwiched between the two sheets of glass. The interlayer may be provided for bonding, added strength and acoustic dampening properties, for example. Materials of the interlayer may be heat resistant and/or rubber like and may include materials which commonly are used as gaskets, sealants or adhesives, among others. Tempering of the class improves robustness and protects the glass against scratching, acid, humidity, UV radiation, and the like. It also provides protection against cracking or breaking in case of accidents or stroke impact.

Polyvinyl butyral (or PVB) is a resin e.g. used for applications that require strong binding, optical clarity, adhesion to many surfaces, toughness and flexibility. It is prepared from polyvinyl alcohol by reaction with butyraldehyde. Generally, a laminated glass as used in the present invention may comprise a protective interlayer, such as polyvinyl butyral, bonded between two panels of glass. The bonding process may take place under heat and pressure. When laminated under these conditions, the PVB interlayer becomes optically clear and binds the two panes of glass together. Once sealed together, the glass "sandwich", or laminate, behaves as a single unit and looks like normal glass. The polymer interlayer of PVB is tough and ductile, so brittle cracks will not pass from one side of the laminate to the other.

Annealed glass, heat-strengthened or tempered glass can be used to produce laminated glass. While laminated glass will crack if struck with sufficient force, the resulting glass fragments tend to adhere to the interlayer rather than falling free and potentially causing injury.

In practice, the interlayer provides several beneficial properties to laminated glass panes: for example, the interlayer functions to distribute impact forces across a greater area of the glass panes, thus increasing the impact resistance of the glass. Further, the interlayer functions to bind the resulting shards if the glass is ultimately broken. Moreover, the viscoelastic interlayer undergoes plastic deformation during impact and under static loads after impact, absorbing energy and reducing penetration by the impacting object as well as reducing the energy of the impact that is transmitted to impacting object, e.g. a passenger in a car crash. Thus, the benefits of laminated glass include safety and security. Further, experiments have shown that the laminated glass structure is very suitable as a speaker diaphragm.

As an alternative to PVB, ethylene-vinyl acetate (EVA) can be used between two or more layers of glass. The interlayer keeps the layers of glass bonded even when broken, and its high strength prevents the glass from breaking up into large sharp pieces. This produces a characteristic "spider web" cracking pattern when the impact is not enough to completely pierce the glass. In the case of the EVA, thermoset EVA offers a complete bounding (crosslinking) with the material whether it is glass, polycarbonate, PET, or other types products.

Instead of glass, also polymer sheets can be provided, such as draped sheets or vacuum formed polymer sheets or an injection molded transparent shaped component. For example, a polymer diaphragm may be injection molded and shaped in a tool, or formed from a flat plate and heated and vacuum formed in a tool, or heated and draped over a form to create the desired shape. In this case, a polymer interlayer may be omitted.

In any case, the surface of the diaphragm may be made of or coated from UV stabilized PC (polycarbonate), PMMA or other optically clear material. The surface should be designed such that it is resistant to scratching, acid, humidity, UV radiation, and the like.

The thickness of the interlayer and the outer glass layers may vary to achieve an overall thickness of the diaphragm in the range of about 1.8 to 2.2 mm, for example.

As mentioned above, in several examples, the diaphragm is made of clear material wherein, in a multilayer construction, each of the layers is clear. In the context of this application clear may designate a material fully transparent to light the visible range or a material having a transparency to light in the visible range of between 50 and 100%. In this sense, translucency is considered a superset of transparency. For example, the diaphragm may be formed from glass layers that are clear and may be processed in various transparent color hues, or with additional secondary processes to create a decorative surface. A surface at 100% transparent would be optically clear. By design the transparency can change with the various decorative processes, such as printing, laser or chemical etching. The diaphragm may be semi translucent to allow for a backlight effect.

SHORT DESCRIPTION OF DRAWINGS

Figure 2:
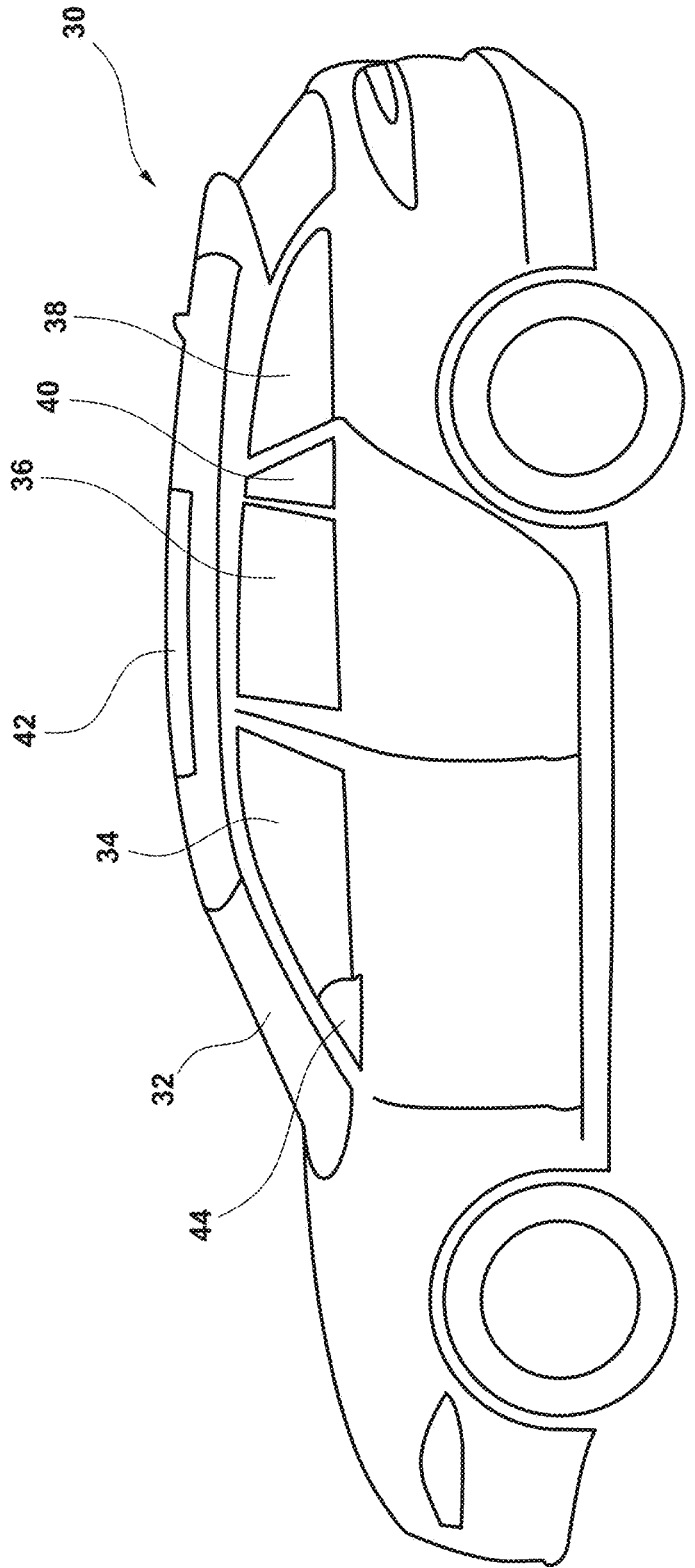
Figure 3A:
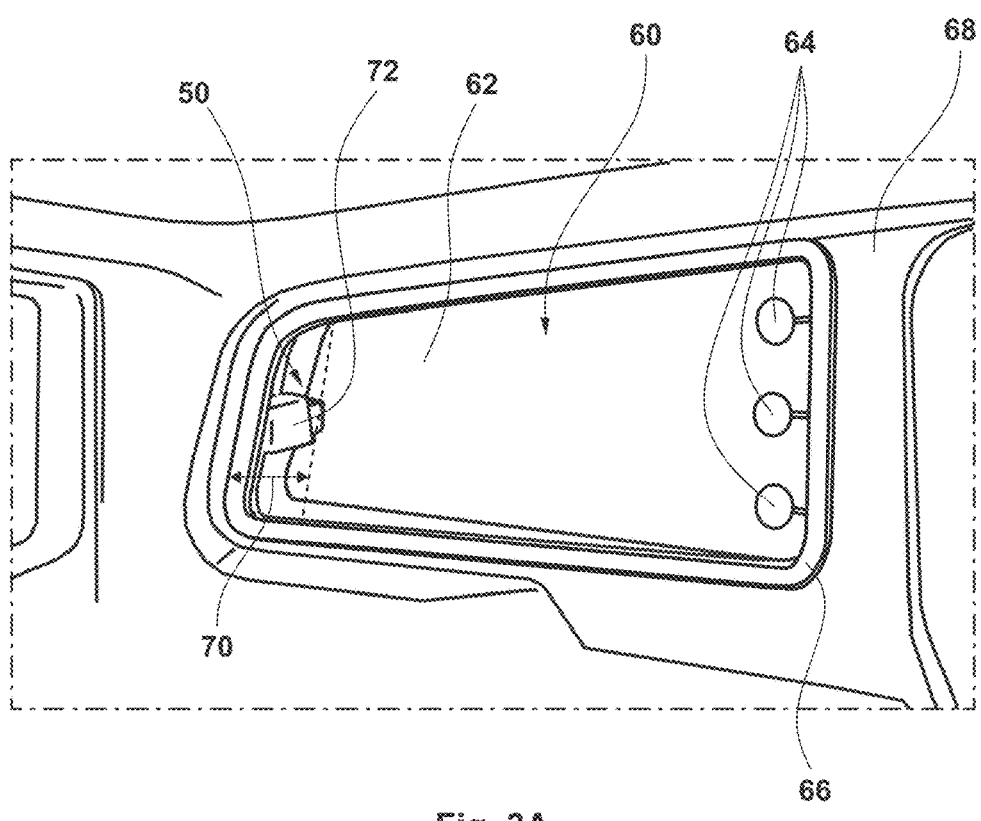
Figure 3B:
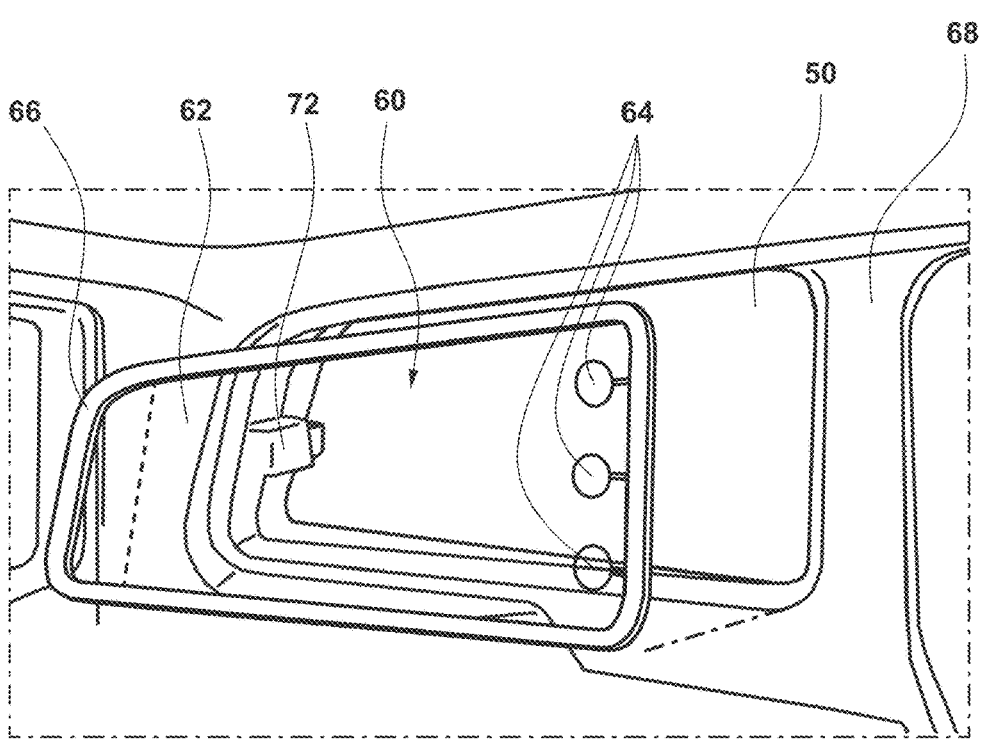
Figure 3C:
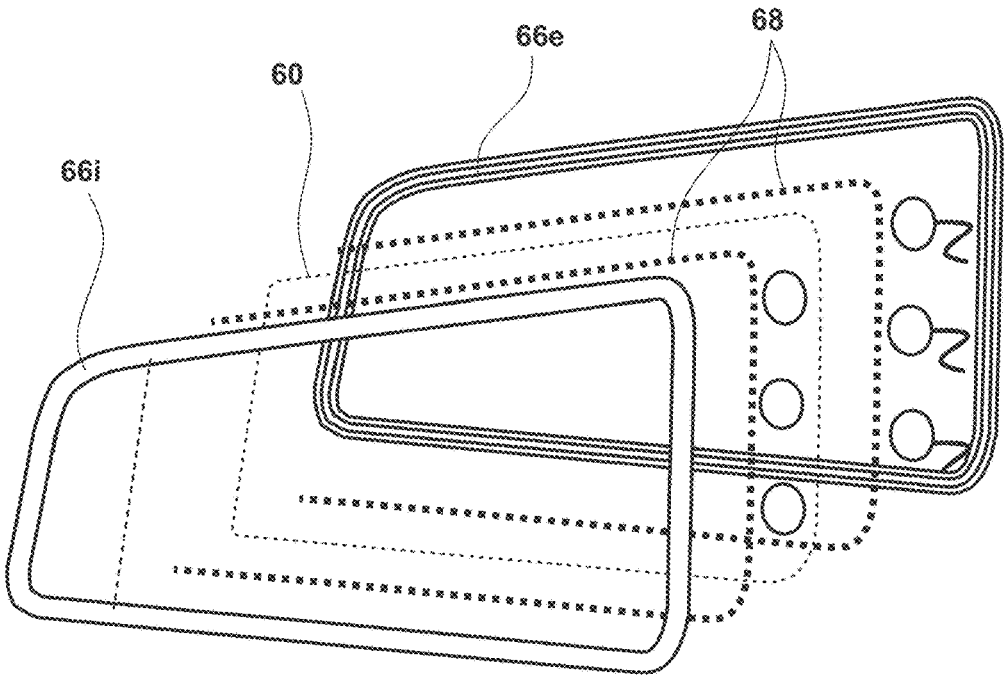
Figure 3D:
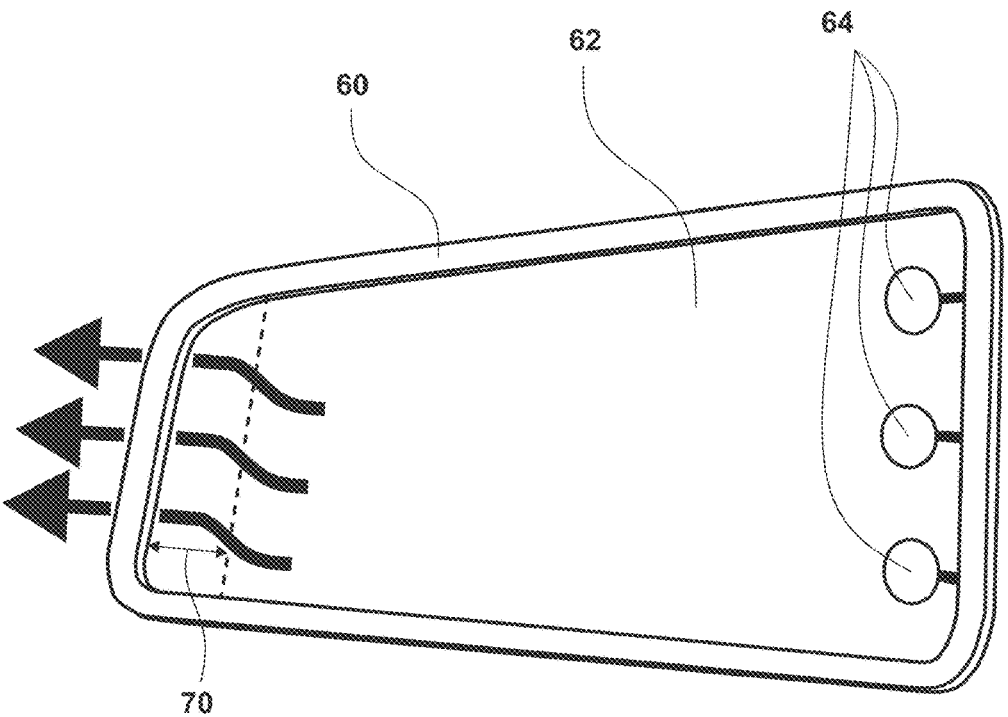
Figure 4A:
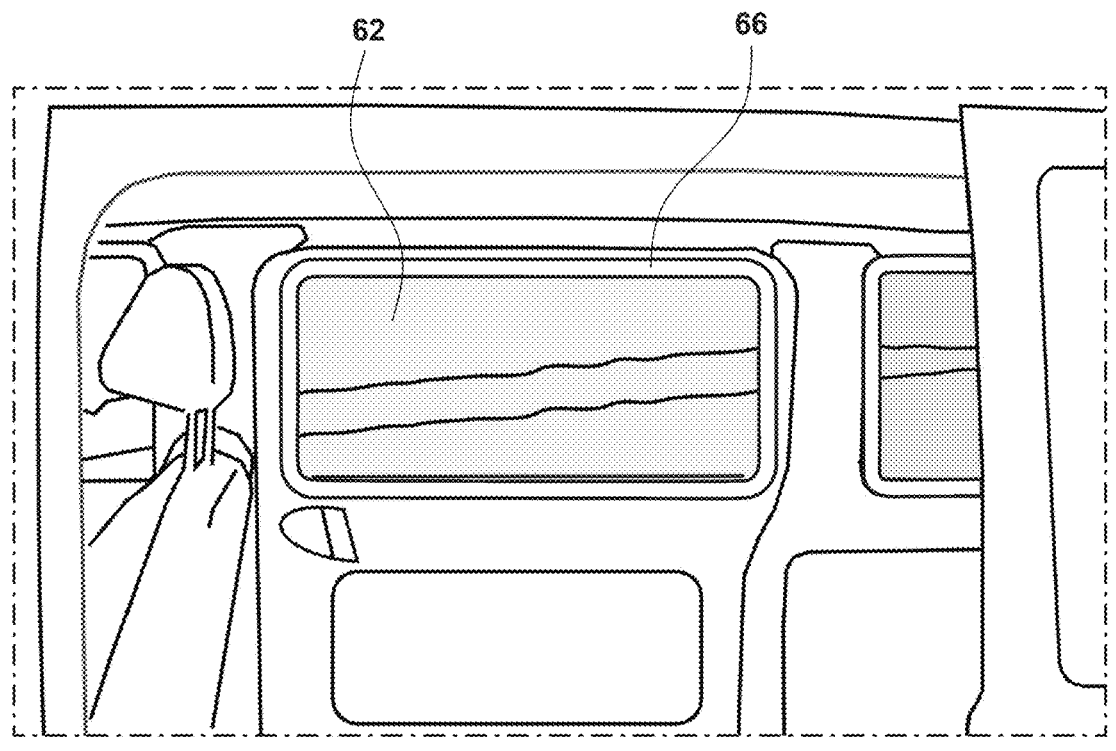
Figure 4B:
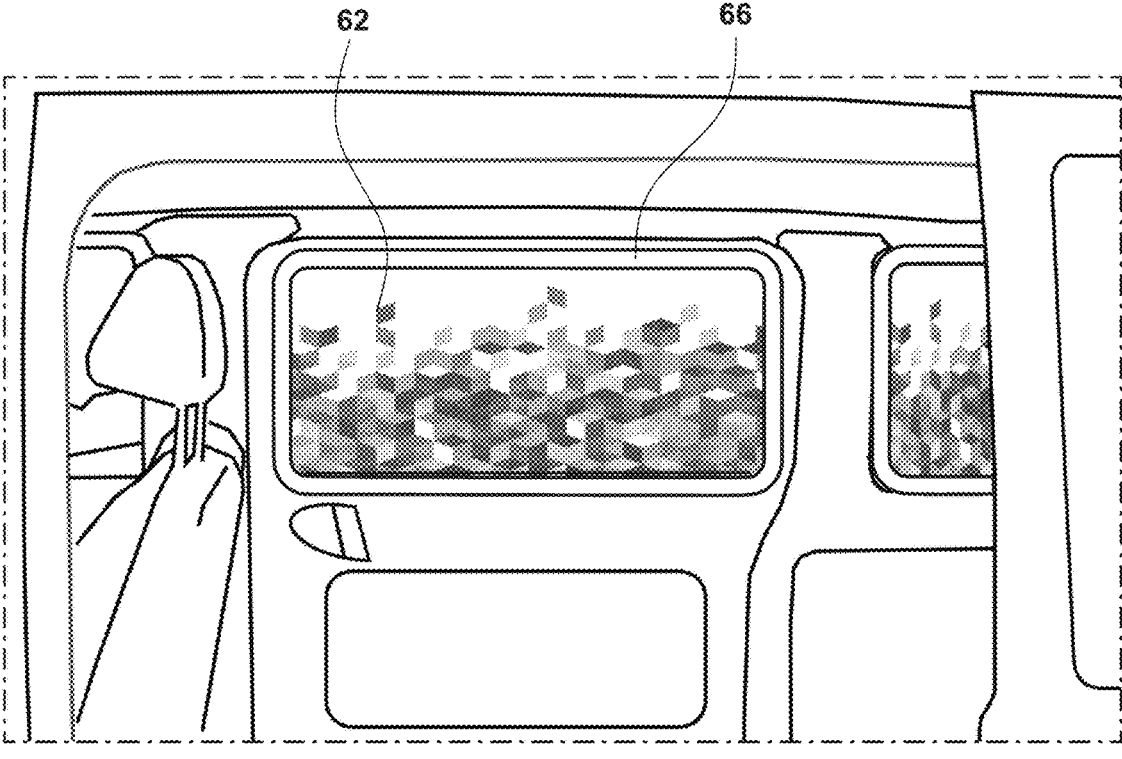
Figure 4C:
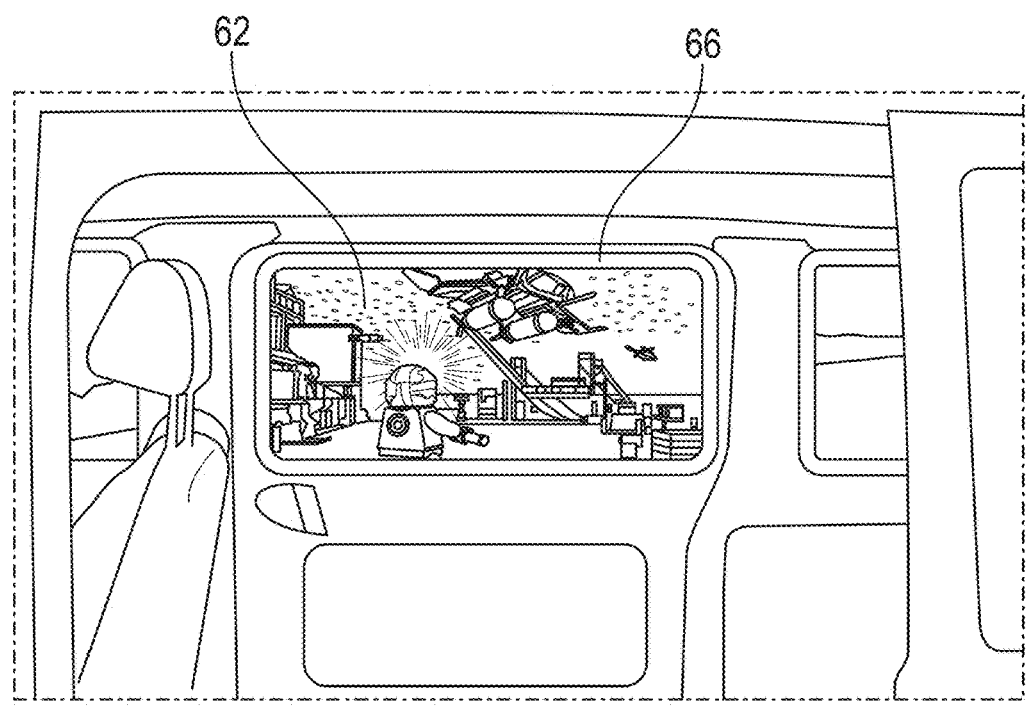
Figure 5A:
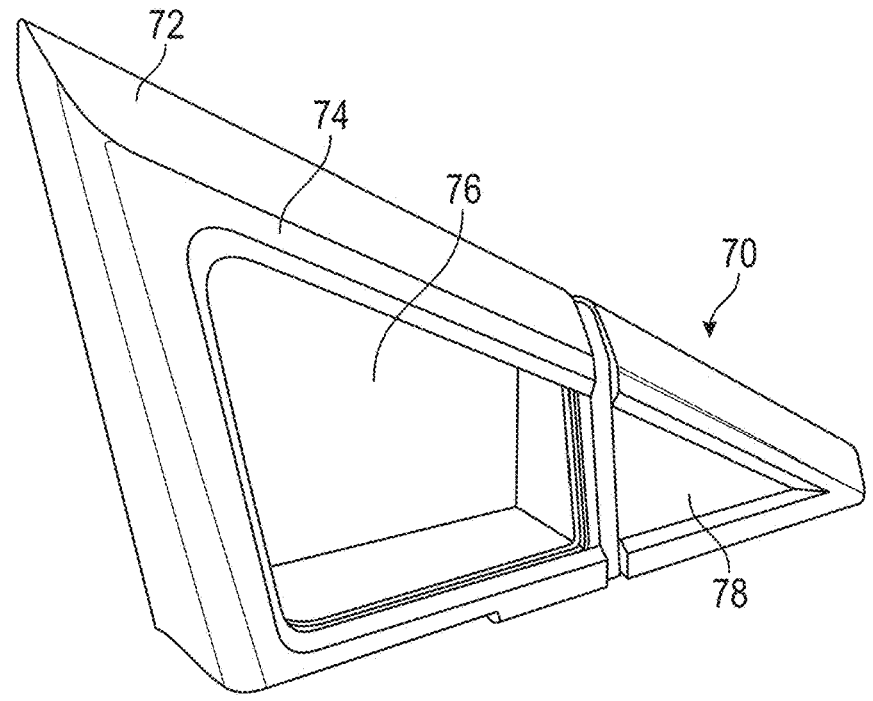
Figure 5B:
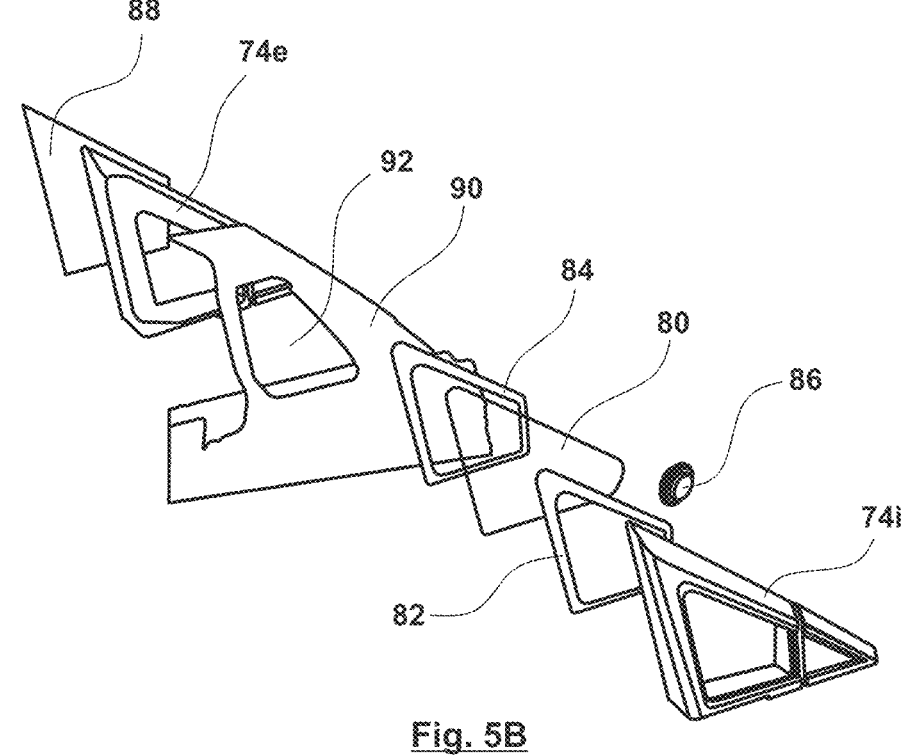
Figure 5C:
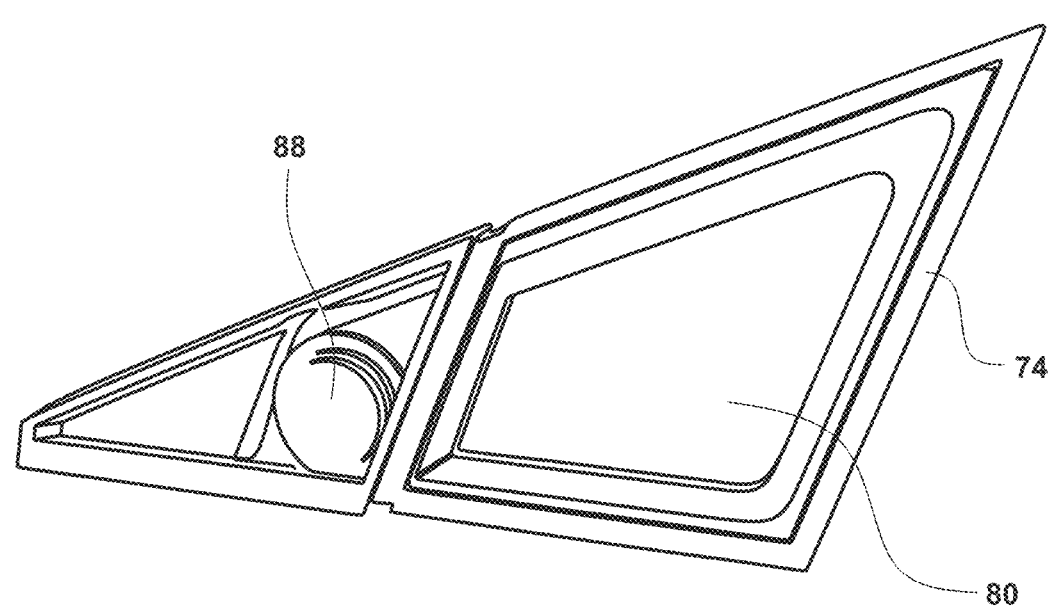
Figure 7A:
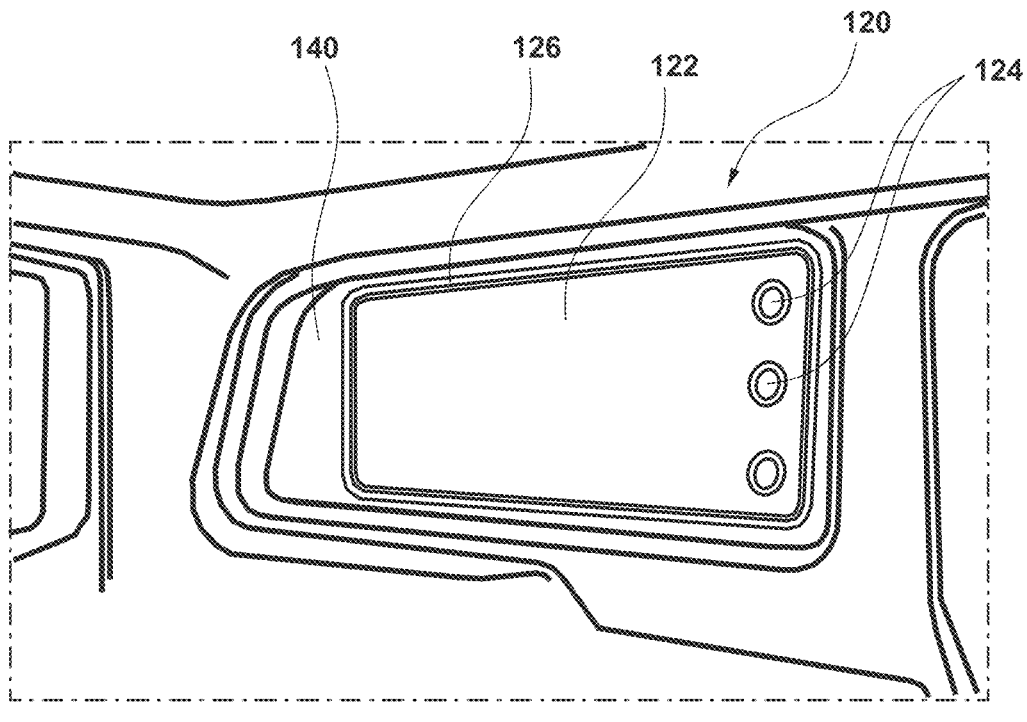
Figure 7B:
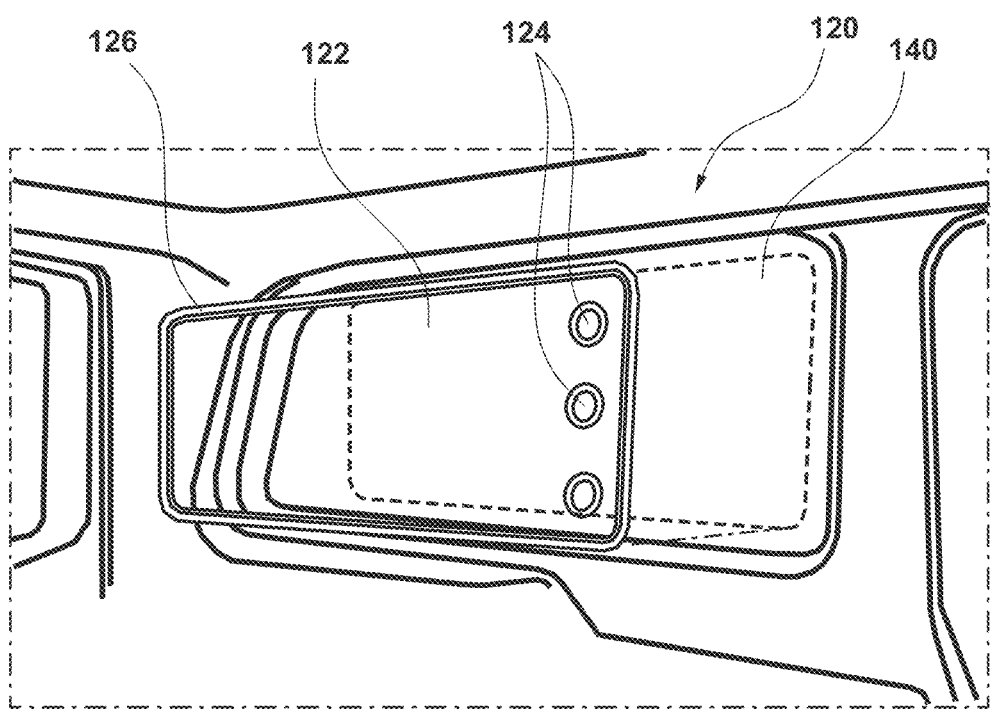

The invention is described with reference to different examples in view of the drawings, wherein:

FIG. 1 schematically illustrates a vehicle according to an example;

FIG. 2 schematically illustrates another vehicle according to another example;

FIGS. 3A, 3B and 3C schematically illustrate a loudspeaker arrangement according to an example in an mounted state, a pre-mounting state and in an exploded view;

FIG. 3D schematically illustrates the loudspeaker arrangement according to the example in a functional diagram;

FIG. 4A, 4B, 4C schematically illustrate a loudspeaker arrangement according to another example;

FIGS. 5A, 5B and 5C schematically illustrate a loudspeaker arrangement according to another example in a perspective interior view, an exploded view, and a perspective exterior view;

FIG. 6A to 6E schematically illustrate a loudspeaker arrangement according to another example in a perspective view, an exploded view, two sectional views and another perspective view;

FIGS. 7A and 7B schematically illustrate a loudspeaker arrangement according to another example in perspective views, assembled and disassembled.

DESCRIPTION OF EXAMPLES

The invention is described with reference to different examples. The skilled person will understand that details of the examples, such as materials and other properties of the transparent diaphragm, the window glass and the carrier as well as the transducer and related components, which are described with reference to one embodiment can also be used in other embodiments even is this is not explicitly mentioned in each case and for each combination of features.

FIG. 1 schematically illustrates an example of a vehicle in which a loudspeaker arrangement according to the invention may be implemented. In this example, the vehicle 10 is a minivan having a front window screen 12, a front side window 14, a sliding door window 16, a rear side window 18, upper panoramic windows 20, an optional sunroof (not shown), and a side mirror mounting area 22, for its triangular shape also referred to as mirror sail. In different examples, at least the non-moving windows 16, 18, and 20, the sunroof and the side mirror mounting area 22 can be mounting areas for the loudspeaker arrangement of this invention. In an example where the loudspeaker arrangement is mounted in the side mirror mounting area 22, a conventionally opaque carrier of the side mirror 24 may be replaced at least partially by a frame and window glass.

The loudspeaker arrangement of this invention also may be mounted in other nontraditional locations where a window glass (not shown) may be provided in columns and body parts of the vehicle, such as in the area of A pillar, C pillar, or door panel below the belt line, i.e. below the lower edge of the traditional windows 14, 16, 18. The loudspeaker arrangement also may be arranged in the area of a window having limited opening capacity, such as a hinged quarter window or a sliding window having a limited moving range.

FIG. 2 schematically illustrates another example of a vehicle in which a loudspeaker arrangement according to the invention may be implemented. In this example, the vehicle 30 is a passenger car having a front window screen 32, a front door window 34, a rear door window 36, a rear side window 38, a rear quarter window 40, a sunroof 42, and a side mirror mounting area 44, for its triangular shape also referred to as mirror sail. In different examples, at least the non-moving windows 38, 40 and 42 and the side mirror mounting area 44 can be mounting areas for the loudspeaker arrangement of this invention. In an example where the loudspeaker arrangement is mounted in the side mirror mounting area 44, a conventionally opaque carrier of the side mirror may be replaced at least partially by a frame and window glass. Assuming that the rear door window 36 has a limited moving range, e.g. opening only halfway or so, a loudspeaker arrangement also could be arranged in front of part of the rear door window 36. As in the example of FIG. 1, the loudspeaker arrangement of this invention also may be mounted in other nontraditional locations, as explained above.

It is possible to arrange a plurality of loudspeaker arrangements to overlap one or more window glasses, optionally in combination with other traditional loudspeaker locations, to provide different types of speakers in different areas of the vehicle cabin. For example, a loudspeaker arrangement may be located in a lower area of the vehicle, e.g. below the belt line, and maybe configured to provide lower frequency range sound, whereas another loudspeaker arrangement may be located in the area of the vehicle windows 16, 18, and 20; 36, 58, 40, 42 or at the side mirror mounting area 22, 44 and may be configured to provide higher frequency range sound.

FIG. 3A to 3D schematically illustrate different views of a loudspeaker arrangement according to an example which is associated with a hinged rear quarter window 50. As shown in FIGS. 3A and 3B, the loudspeaker arrangement 60 comprises an at least partially transparent diaphragm 62 and at least one transducer, in this example three transducer 64, wherein movement of the transducers 64 causes vibration of the diaphragm 62 to generate sound by vibration of the diaphragm 62. The diaphragm 62 has a front face directed towards an interior of the vehicle and an opposite rear face facing and spaced from window glass of the hinged rear quarter window 50. The diaphragm 62 is supported by a carrier 66 which includes a frame, which may be attached to or be part of an interior trim part 68 of the vehicle, such as an interior lining of the vehicle cabin and/or which may be attached to the body-in-white of the vehicle. For attaching the carrier, clips, in-mold clips, or screw fasteners may be used, for example.

As illustrated in further detail below, the loudspeaker arrangement 60 includes an at least partially transparent diaphragm 62 and at least one transducer 64 coupled to the respective diaphragm. Movement of the transducer causes vibration of the diaphragm to generate sound. An example of the transducer 64 is a piezo actuator. The transducer 64 can be located on the diaphragm 62 to be visible, as seen in FIG. 3A to 3D, or, if the carrier 62 comprises a broader frame or another carrier component overlapping with part of the diaphragm 62, the transducer 64 also can be located in an area overlapped by the carrier 62 to be hidden from view.

With the example of FIG. 3A to 3D relating to a hinged window, which can be opened to allow air circulation, the diaphragm 62 is dimensioned to leave a space 70 between the rear portion of the carrier 66 and a rear edge of the diaphragm 62 to allow access to an opening mechanism 72 of the hinged rear quarter window 50 and to allow air circulation, as schematically illustrated in FIG. 3D.

FIG. 3C schematically illustrates an example of the architecture of the loudspeaker arrangement, including an interior portion 66i and exterior portion 66e of the carrier 66 between which the diaphragm 62 is sandwiched. The diaphragm 62 may be attached to the interior and exterior portions 66i and 66e of carrier 66 via seal and spacer strips 68 and may be suspended in the carrier 66 around its entire or at least part of its perimeter. As illustrated in this example, the rear edge of the diaphragm 62 stays clear of the rear portion of the carrier 66 to provide the space 70 for air circulation.

The loudspeaker arrangement of this and other examples may be configured in a way that the carrier 66 can be attached to the body-in-white of the vehicle. Additionally or alternatively, the carrier can be attached to an interior component 68 of the vehicle, in particular to an interior trim part, or can be part thereof. The loudspeaker arrangement can be configured in a way that it can be easily replaced, serviced, repaired, refitted, upgraded and/or exchanged.

The diaphragm 62 may be flat or formed to have 2.5D or 3D shapes. It may be made from glass and, in a particular example, may include a sandwich construction consisting of two about 0.5 mm thick tempered sheets of glass laminated to a PVP, or EVA, for example. The middle layer is provided for bonding, added strength and may effect acoustic properties and is sandwiched between the two glass sheets. The dimensions of the middle layer may vary around a thickness of about 0.6 mm, and the overall thickness of the entire diaphragm may be in the range of about 1.8 to 2.2 mm. The outside perimeter of the diaphragm may vary in shape according to the window glass which the loudspeaker arrangement is associated with.

The surface of the diaphragm 62 may include decorative elements which may include graphic elements formed by printing, such as screen printing, digital inkjet printing, rolled printing and laser and/or chemical etching on either one or both of the front face and the rear face of the diaphragm 62. Additive surface decoration and treatments may be provided, including over molding polymer in an injection molding process, 3D printing a polymer design directly onto a treated glass surface; 3D printing glass design over a treated glass surface, wherein such additive surface decoration also may be provided separately from the diaphragm, at a small distance of e.g. 2.0 mm, as to not interfere with the speaker function of the diaphragm.

The transducer 64, such as a piezo transducer or exciter, is located at a position on the diaphragm 62 where the diaphragm is flat and, optionally, where the transducer cannot be perceived by the passage of the vehicle, e.g. because it is hidden by the carrier 66, or in a side area of the diaphragm 62, as shown in FIG. 3A to 3D. The transducer 64 may be attached to a flat surface area of the diaphragm 62 via a bonding foam casket seal, with the transducer 64 press fitted to the flat area to be attached thereto. Whereas the transducer 64 could be located in the center of the diaphragm 62, which one may assume would be preferable for achieving optimal acoustic results, experiments have shown that an attachment of the transducer 64 closer to an edge of the diaphragm achieves remarkably good sound performance. In various examples, the transducer 64 is attached in a side or lower third area of the diaphragm. In other examples, the transducer may be offset from the center of the diaphragm towards any edge to be located somewhere between the center and the edge of the diaphragm, e.g. in an outer third or outer quarter area of the diaphragm, to locate the transducer in an area which may or may not be hidden by the carrier 66. This provides a clear and unobstructed surface of the diaphragm 62 which, in addition to providing the loudspeaker function, allows to see through the diaphragm which additionally can be illuminated, used as a display, decorated or provided with additional design features without or little perceivable presence of the transducer and associated wiring.

As mentioned above, the diaphragm 62 may be attached to the carrier 66 by a sealing tape 68, such as a sealing foam bonding tape. The sealing tape also functions as a spacer to support the diaphragm spaced from the carrier 66 to allow unobstructed vibration. Additional or alternative fasting means, such as clips or fasteners, may be provided to join the entire assembly including the carrier frame portion 66i, diaphragm 62, frame portion 66e and associated seals 68. The transducer 64 may be connected to a control unit (not shown), such as a vehicle ECU, via a wire harness (not shown) to be connected to a door wiring harness (also not shown) or by wireless communication technology.

The diaphragm 62 may be shaped to tune the sound produced by the loudspeaker. For example, a circular acoustic pattern can be formed on the diaphragm surface, e.g. by printing, etching or over molding to direct sound generated by the diaphragm. The transducer can be integrated within the pattern to control and direct the vibration generated by the transducer towards the center of the diaphragm. For example, the circular pattern can have a center which coincides at least approximately with the center of the diaphragm to evenly radiate sound waves from the center, and the transducer is integrated into the circular pattern. The surface shape is such that it gives "shape" to the sound waves.

In another example, a honeycomb acoustic pattern can be formed on the diaphragm surface by an additive process, such as over molding, 3D printing and injection molding. Also the honeycomb pattern can have the effect to evenly radiate acoustic waves from the exposed portion of the diaphragm.

FIG. 4A to 4C schematically illustrate an example in which the loudspeaker arrangement of this invention is associated with a side window of a vehicle, such as the side windows 16 and 18 of the minivan illustrated in FIG. 1. The loudspeaker arrangement comprises a sound generating diaphragm 62 supported by a carrier 66 and configured and arranged to fully overlap an associated side window. The diaphragm 62 is supported by the carrier 66 at a distance to the associated window glass, such as a distance of 2 to 200 mm, more particularly 2 to 60 mm or 50 to 125 mm or about 20, 30, 40, 50, 60, 70, 80, 90 or 100 mm. At least one transducer (not shown) is attached to a surface of the diaphragm 62 to generate sound by vibration.

The diaphragm 62 may be fully transparent or may be provided with a mechanism to control transparency and/or color hue, by providing a diaphragm configured as a smart glass or switchable glass whose light transmission properties are altered when voltage, light and/or heat is applied, for example. This also allows providing a privacy glass which can be tuned from fully transparent to fully opaque, for example.

The diaphragm also may be provided with the decorative design by printing, overmolding, or etching, for example, as illustrated in FIG. 4 B.

In another example, the diaphragm may have the function of a display screen and/or a light source, to display images, moving images, writing, and/or to provide ambient or orientation light, for example.

A light source (not shown) may be provided behind the diaphragm 62 at a location spaced from the diaphragm, e.g. at the carrier or an interior component to which the carrier is attached, to generate light which is transmitted through the diaphragm 52, from back to front, to provide an illuminated decorative surface and/or a display surface. A light source (not shown) may be provided in or at the carrier 66 around an edge of the diaphragm 62 to feed light through the edge of the diaphragm to the diaphragm surface from where it is emitted. The light source may be an LED light source or projector, e.g. an SMD LED light source, for example. One or more LEDs may be provided at different locations.

As indicated, the surface of the diaphragm may be structured to shape the sound, such as direct, focus or concentrate sound to any desired position, e.g. to a position near a head position of the driver or passenger, or to scatter or distribute sound within the passenger cabin as desired. The shape of the diaphragm may be obtained by cold forming or hot forming or injection molding, depending on the desired bending radii, and the structure and manufacturing technology of the diaphragm. The diaphragm may have any arbitrary and suitable perimeter contour. The diaphragm also may have a rippled or waved surface which may be 2.5D shaped in one cross-sectional direction and flat in a direction perpendicular thereto. A flat area may be provided for attachment of the transducer. The diaphragm may be from a multilayer glass sheet or single polymer sheet, as explained above.

FIG. 5A to 5C illustrate a loudspeaker arrangement 70 according to another example of the invention in which the loudspeaker is associated with a side mirror mounting area or mirror sail, as shown at 22 and 44 in FIGS. 1 and 2. The assembled loudspeaker arrangement 70 is shown in FIG. 5A as comprising a carrier 72 which, in this example, is an interior trim part but also can be part of, integrated in or attached to an interior trim part. The carrier 72 also can be directly attached to a door panel of vehicle in particular a body-in white portion of the vehicle. As shown in FIG. 5A, the carrier 72 comprises a frame portion 74 supporting an at least partially transparent diaphragm 76 in a mirror mounting area 78 where a side mirror is to be mounted at the exterior of the vehicle door.

FIG. 5 B shows the loudspeaker arrangement 70 in an exploded view, including an interior portion 74i of the carrier, exterior portion 74e of the carrier, a transparent sound generating diaphragm 80, interior and exterior foam spacers and seals 82, 84, and a transducer 86 in combination with an exterior window glass 88 all of which, when assembled, are mounted to a vehicle door panel 90, e.g. a body-in-white part, having a cut out 92 for mounting the loudspeaker arrangement 70.

For assembling and mounting the loudspeaker arrangement 70, in this example, the window glass 88 is mounted to the exterior portion 74e of the carrier and attached to the exterior face of the vehicle door panel 90. The transparent diaphragm 80 is mounted to the interior portion 74i of the carrier via the foam spacer and seal 82 wherein the transparent diaphragm 80 is dimensions such that it fully overlaps a cut out 74c in the interior portion 74i of the carrier and extends into a mirror mounting space where the transducer 86 is attached to the surface of the diaphragm 80, hidden from view by the opaque carrier 74 covering the mirror mounting space. The transducer 86 is connected to wiring (not shown) or includes a wireless communication device, and this preassembled unit is attached to the interior surface of the vehicle door panel 90 via the foam spacer and seal 84.

After or during mounting the loudspeaker arrangement, also an external side mirror can be attached to the exterior portion 74e of the carrier in the mirror mounting space. FIG. 5C illustrates the assembled loudspeaker arrangement as seen from the outside, with the transducer 86 attached to the diaphragm 80 in the mirror mounting space, and with the mirror omitted.

The diaphragm and the transducer may be configured as described above wherein the different features describe may be used individually or any combination thereof. It is specifically noted that all examples and variants of the diaphragm, the transducer, the carrier, optional light sources etc., as described above, can be used individually and in combination in any of the example described herein.

Movement of the transducer causes vibration of the diaphragm to generate sound. An example of the transducer 86 is a piezo actuator. The transducer 86 can be located on the diaphragm 82 to be visible, as shown in FIG. 3A to 3D, or, to be hidden behind the carrier 74, as in the present example.

Figure 6A:
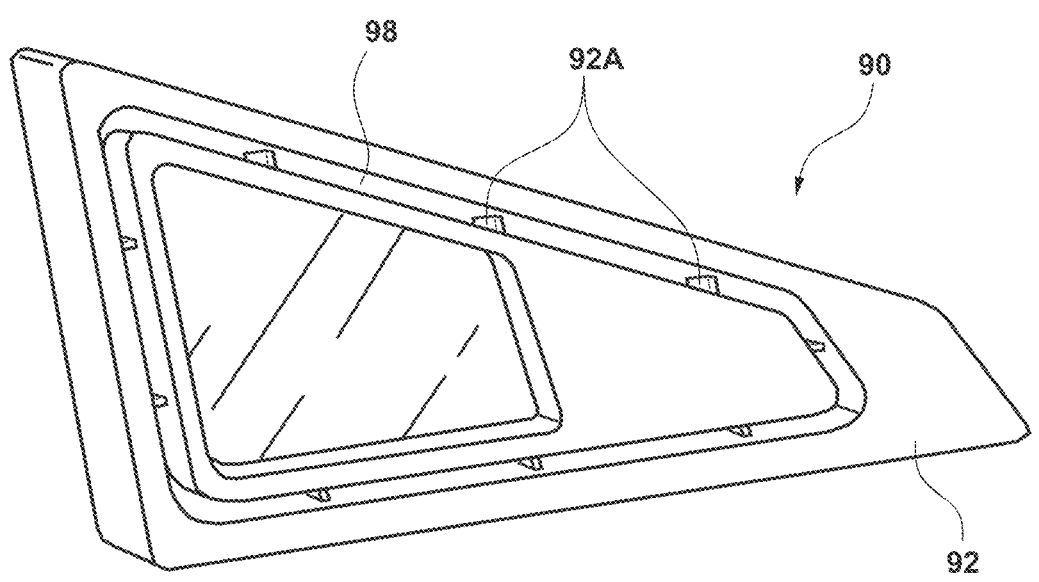
Figure 6B:
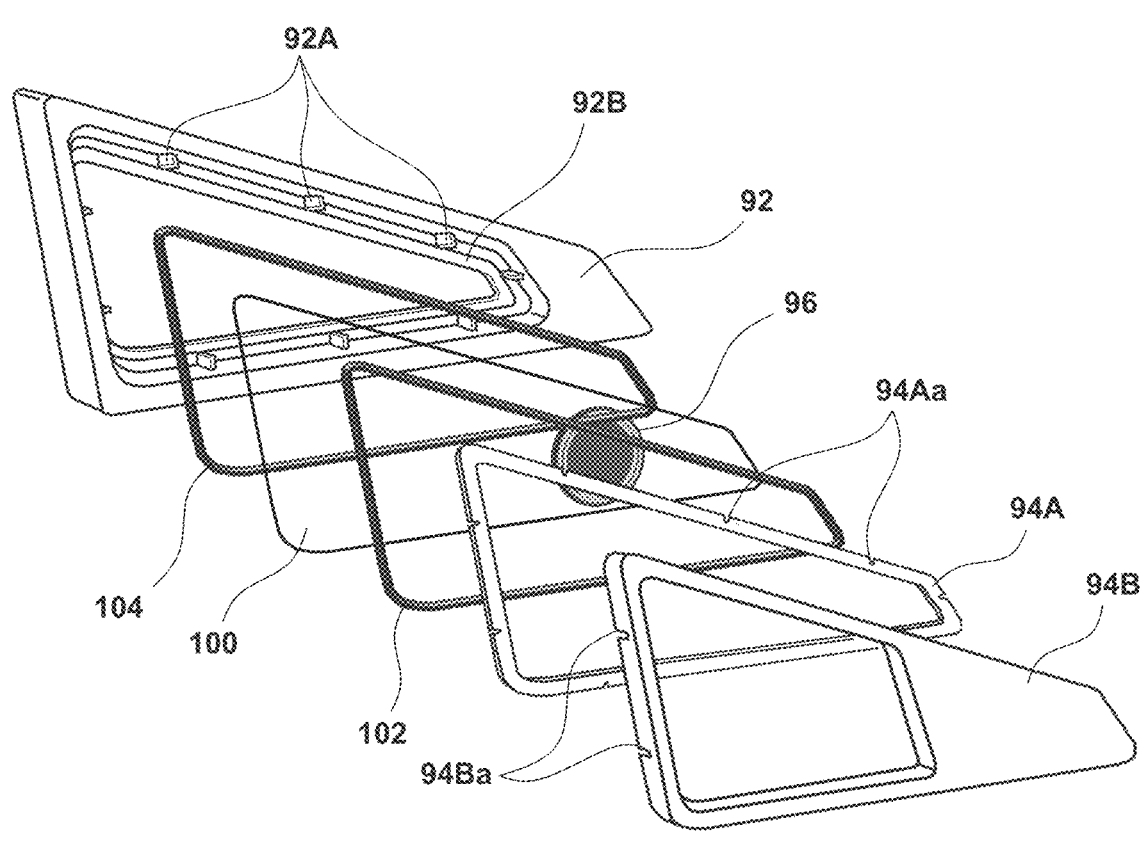

FIG. 6A to 6D illustrate a loudspeaker arrangement 90 according to another example of the invention in which the loudspeaker is associated with a side mirror mounting area or mirror sail, as shown at 22 and 44 in FIGS. 1 and 2. The assembled loudspeaker arrangement 90 is shown in FIG. 6A as comprising a carrier 92 which, in this example, is an interior trim part but also can be part of, integrated in or attached to an interior trim part. The carrier 92 also can be attached directly to a door panel of vehicle, in particular a body-in white portion of the vehicle. As shown in FIGS. 6A and 6B, the carrier 72 supports a two-part frame 94, including frame portions 94A, 94B to attach an at least partially transparent diaphragm 100 to the carrier 92. The loudspeaker arrangement 90 will be mounted in an area where a side mirror is to be mounted at the exterior of the vehicle door.

FIG. 6B shows the loudspeaker arrangement 90 in an exploded view, for illustrating further details. The carrier 92 has a cut out and includes ribs 92A arranged along an inner perimeter of the cut out to engage with the frame 94A, 94B. The loudspeaker arrangement 90 is assembled by mounting a transparent sound generating diaphragm 100, sandwiched between interior and exterior foam spacers and seals 102, 104, to rest against a flange 92B surrounding the cutout of the carrier 92. The ribs 92A are spaced around the diaphragm 100 and may register the diaphragm 100 when it comes to rest against the flange 92B. The frame portion 94A is then placed over the diaphragm 100 and engages with the ribs 92A which are inserted in grooves 94Aa at the outer perimeter of the frame portion 94A. In this example, the second frame portion 94B is placed over the assembly of carrier 92, diaphragm 100 and frame portion 94A, and is fixed also by engagement with the ribs 92A which are inserted in grooves 94BAa at the outer perimeter of the frame portion 94B. The frame portions 94A, 94 B may be held in place by said engagement or may additionally be fixed by e.g. adhesive or welding, such as ultrasound welding. The ribs have a double function as sound directing vanes and as link between the carrier 92 and the frame 94 and corresponding other components can be used for obtaining the same or a similar functionality instead. For example, instead of ribs, other types of bridges can be provided. In an alternative configuration, vanes or other sound guiding elements may be attached to or integrated with the frame 94 and engaged with the carrier 92 during assembly.

A transducer 96 is attached to the surface of the diaphragm 100, hidden from view by an opaque portion of the frame portion 94B covering the mirror mounting space. The transducer 96 may be connected to wiring (not shown) or include a wireless communication device. The preassembled loudspeaker arrangement 90 may be attached to the interior surface of the vehicle door panel 90.

After or during mounting of the loudspeaker arrangement 90, also an external side mirror can be attached to the exterior portion of the carrier 92 in the mirror mounting space.

Figure 6C:
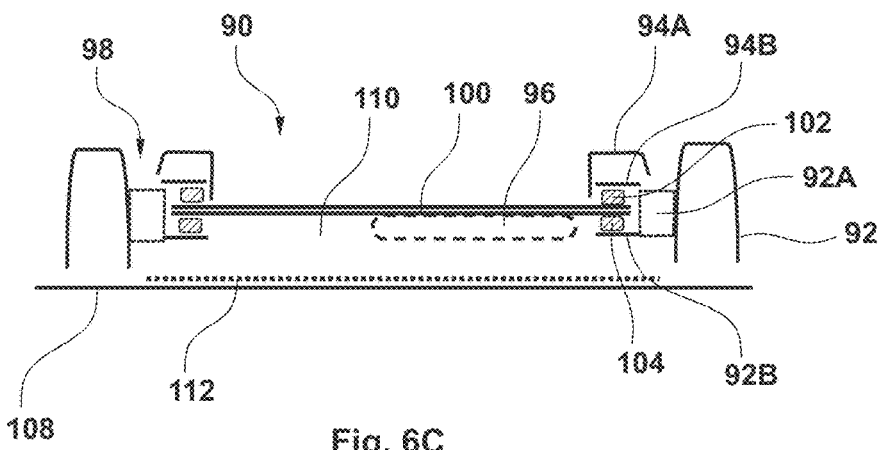
Figure 6D:
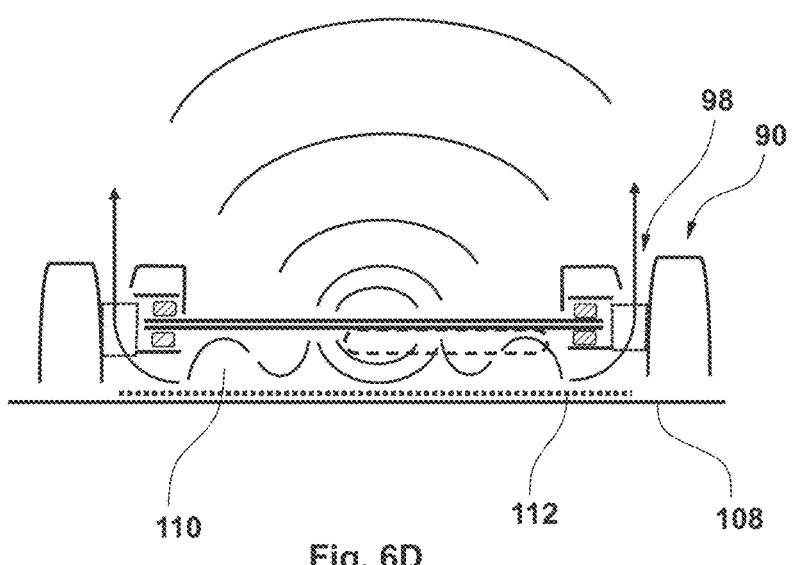
Figure 6E:
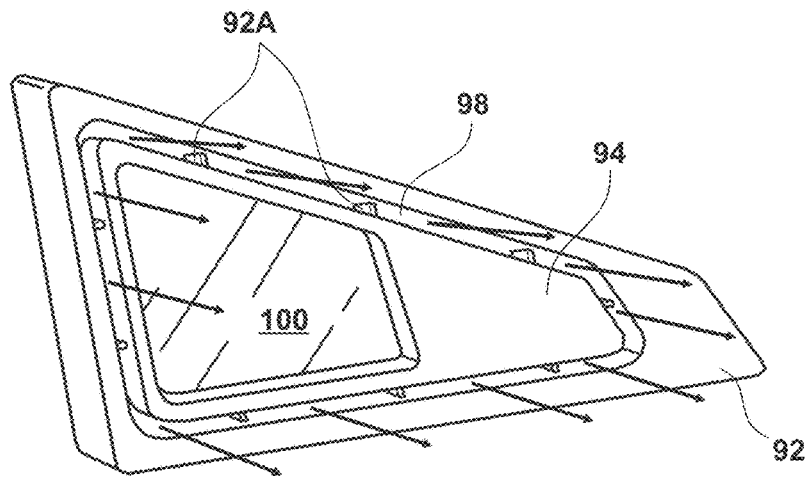

FIG. 6D illustrates the assembled loudspeaker arrangement as seen from the inside of the vehicle cabin. A gap 98 is formed between the carrier 92 and the frame 94 which allows sound (illustrated by arrows in FIG. 6D) to be emitted from behind the diaphragm 100. The sound can be directed by the ribs 92A which can be shaped as sound directing vanes and can be arranged at different locations and spacing and may be orthogonal or tilted relative to the plane of the diaphragm 100.

The diaphragm and the transducer may be configured as described above wherein the different features described may be used individually or any combination thereof. It is specifically noted that all examples and variants of the diaphragm, the transducer, the frame, optional light sources etc., as described above, can be used individually and in combination in any of the example described herein.

Movement of the transducer causes vibration of the diaphragm to generate sound. An example of the transducer 86 is a piezo actuator. The transducer 86 can be located on the diaphragm 82 to be visible, as shown in FIG. 3A to 3D, or, to be hidden below the frame 94, as in the present example.

As illustrated in FIGS. 6C and 6D, the loudspeaker arrangement, including the carrier 90, the frame 94, the diaphragm 100 and the transducer 96 (for further details, please refer to the description of FIGS. 6A and 6B above), is mounted relative to a window glass 108. A space 110 is formed between the backside of the diaphragm 100 and the front side of the window glass 108, the periphery of the space 110 is enclosed by the carrier 94. The gap 98 between the carrier 92 and the frame 94 allows sound waves to exit from the space 110 to the passenger cabin.

The space and the opposing surfaces of the diaphragm 100 and the window glass 108 can be designed to tune and improve the sound generated by the loudspeaker arrangement. Various types of surface treatment of the diaphragm have been described above and can be applied to both surfaces of the diaphragm 100 also in this example.

Moreover, an additional film on the interior surface of the window glass 108 or another surface treatment which changes the glass surface characteristic may tune and improve the loudspeaker sound. A surface film or other surface treatment of the window glass 108 is schematically illustrated by a dotted line 112 in FIGS. 6C and 6D and, in the following, is referred to as surface treatment.

With the surface treatment 112 and surrounding gap 98 the sound generated by the diaphragm 100 and reflected off the glass surface, can be tuned and directed into the interior cabin. Shaped ribs on the carrier 92 may act as vanes and direct the sound. The ribs 92A e.g. may be elliptically shaped, straight or bent, funnel shaped or even may be movable to direct the sound.

In one example, a transparent acoustic film 112 can be attached to the surface of the window glass 108 to improve the sound quality. For example, a nano-acoustic film can be used which commonly may be used for sound isolation, dampening, absorption and/or as a diffuser. Useful films are produced e.g. by 3M (e.g. 3M™ Vibration Damping Tape, 3M™ VHB™ Tape, 3M™ Slick Surface Tape) and Sekisui. The film 112 may be added to the glass surface to adjust, tune and improve the loudspeaker sound quality. Such transparent acoustic films may be made of PVD and may be made of the same or similar material as that sandwiched between the two thin glass layers that in combination make up the transparent diaphragm construct, describe above. The film 112 can be applied to the surface of the window glass 108 or can be integrated in a sandwich construction.

In another example, the surface treatment 112 may be based on additive printing and/or another type of manipulation of the glass window surface. For example, a pattern may be screened or digitally printed directly onto the surface of the window glass 108, e.g. with a PU material in multiple layers, shapes and densities. A thickness of the surface treatment may be in the range of 0.2 to 2.0 mm. The pattern can be acoustically engineered together with the interior shape of the space 110 and/or the back surface of the diaphragm 100 and acoustically modeled in combination with the surrounding interior surfaces to create a custom and functional treatment to improve the sound performance of the loudspeaker arrangement 90. In addition, a 3D print of a polymer onto the glass window surface, with the pattern and surface area designed to enhance the sound performance may be provided.

In another example, a surface treatment 112 may be provided by sandblasting, laser etching, chemical etching or coating of the surface of the glass window opposite to the diaphragm 100. This treatment may cover the entire surface or may be applied selectively to only some areas of the surface of the window glass 108. The thickness of the surface treatment may vary e.g. from a few μm to 0.2 mm. The surface treatment 112 may isolate, direct or dampen the soundwaves vibrating from the diaphragm 100 and reflecting onto the glass surface.

FIG. 6D shows a schematic example of soundwaves generated by the diaphragm 100, reflected between the glass window surface and the diaphragm 100 and emitted from the space 110 through the gap 98. In general, as indicated, the surface of the diaphragm 100 and/or the opposite surface of the window glass 108 may be structured to shape the sound, such as direct, focus or concentrate sound to any desired position, e.g. to a position near a head position of the driver or passenger, or to scatter or distribute sound within the passenger cabin as desired.

The structured surface may have a stepped configuration with a plurality of surfaces portions which are inclined relative to a general plane of the window glass 108. By adjusting the inclination, sound can be direct to different areas within the interior of a vehicle cabin. In another example, the window glass surface may have a surface configuration including a plurality of parabolic or micro parabolic shapes which may be convex and/or concave to reflect and focus and/or divert sound waves. By adjusting the size, depth or height, curvature, number, pattern and density of the parabolic shapes sound can be manipulated in different ways, reflected to different areas within the interior of the vehicle cabin, focused, scattered or otherwise emitted into the interior of the vehicle cabin. Further variations of acoustic effects may be obtained by combining parabolic structures of different sizes, combining convex and concave shapes, combining three-dimensional structures of different shapes, and/or adjusting patterns in which these structures are arranged. In a variation, the window glass surface may have a continuous or stepped single convex or concave parabolic shape or dome shape to reflect and direct sound.

FIGS. 7A and 7B show a further example of a loudspeaker arrangement 120 according to the invention. The loudspeaker arrangement 120, similar to the one shown in FIGS. 3A and 3B, comprises an at least partially transparent diaphragm 122 and at least one transducer, in this example three transducers 124, wherein movement of the transducers 124 causes vibration of the diaphragm 122 to generate sound by vibration of the diaphragm 122. The diaphragm 122 has a front face directed towards an interior of the vehicle and an opposite rear face facing and spaced from a window glass 140. The diaphragm 122 is supported by a carrier 126 which, in this example, is implemented as a frame, which may be attached directly to the window glass 140. The frame 126 supports the diaphragm 122 in front of the window glass 140 and spaced thereto. For attaching the frame 126 to the window glass 140, suction cups (not shown) or a similar removable fastening mechanism may be used. This allows easily refitting, servicing, exchanging and maintaining the loudspeaker arrangement 120.

The loudspeaker arrangement further may comprise a wireless communication device to allow communication between a sound source or transmitter of the vehicle and an actuator or transducer of the loudspeaker arrangement 120.

With regard to further details of the loudspeaker arrangement 120, including the diaphragm 122 and its characteristics, reference is made to the description of FIGS. 1 to 6 above.

The shape of the diaphragm may be adapted to the particular application of the interior component and the intended acoustic effect. The shape and orientation of the diaphragm in the interior component can be adjusted to manipulate sound waves emitted from the diaphragm towards surface, in particular to selectively resonate, reflect, divert, scatter, direct and/or focus sound waves.

The diaphragm, in addition to generating sound and being used as a loudspeaker, also may be configured to create different visual effects, including the provision of a controlled sunshade, controllable privacy glass and/or a controllable atmospheric window. The loudspeaker arrangement further may include a light source provided at the carrier, behind the carrier, at the diaphragm or behind diaphragm and configured to transmit light to the front face of the diaphragm. In at least some of these examples, the diaphragm can be configured to provide an orientation or ambient or atmospheric light and/or decoration. The diaphragm also can be configured to be illuminated to display images and/or information, such as directions or advertisement related to the current location of the vehicle.

What is claimed is:

1. A loudspeaker arrangement of a vehicle, comprising:
   a speaker including an at least partially transparent diaphragm and a transducer coupled to the diaphragm, wherein movement of the transducer causes vibration of the diaphragm to generate sound by vibration of the diaphragm, the diaphragm having a front face to be directed towards an interior of the vehicle and an opposite rear face;

a carrier configured to support the diaphragm by supporting the diaphragm at its edges relative to a window glass of the vehicle such that the rear face of the diaphragm faces and is spaced from the window glass;

wherein the window glass is part of a moving window of the vehicle having an open state and a closed state; and wherein the diaphragm is dimensioned to maintain a uniform space between an edge of the diaphragm and a portion of the carrier independent of whether the moving window is in the open state or the closed state, wherein the uniform space is open to air circulation therethrough from outside the vehicle when the moving window is in the open state.

2. The loudspeaker arrangement of claim 1, wherein the loudspeaker arrangement is configured to be mounted in a side mirror mounting area of the vehicle.

3. The loudspeaker arrangement of claim 2, wherein the window glass is located in the side mirror mounting area of the vehicle and the carrier is configured to position the diaphragm to at least partially overlap the window glass.

4. The loudspeaker arrangement of claim 2, wherein an external side mirror is attached to an exterior portion of the carrier.

5. The loudspeaker arrangement of claim 1 wherein the carrier is configured to support the diaphragm spaced from the window glass by a distance in the range of 2 to 200 mm.

6. The loudspeaker arrangement of claim 1, wherein the diaphragm is attached to the carrier via a spacer extending along at least part of the periphery of the diaphragm.

7. The loudspeaker of claim 1, wherein the diaphragm is transparent and/or wherein the diaphragm is tunable from transparent to semi-transparent to opaque.

8. The loudspeaker arrangement of claim 1, wherein the diaphragm is configured to be illuminated to display images and/or information, and/or to provide ambient light.

9. The loudspeaker arrangement of claim 1, wherein the window glass is part of a front or rear vent window, a back quarter window, a back window, and a sun roof and the carrier is configured to position the diaphragm to at least partially overlap the window glass.

10. The loudspeaker arrangement of claim 1, wherein the window glass is located in a side panel or door panel of the vehicle and the carrier is configured to position the diaphragm to at least partially overlap the window glass.

11. The loudspeaker arrangement of claim 1, wherein the diaphragm includes or is part of a digital side view mirror or a digital rearview mirror and/or wherein the diaphragm includes or is part of a touch screen.

12. The loudspeaker arrangement of claim 1, further including a pattern on the front or rear face of the diaphragm, such as a pattern created by printing, overmolding or etching.

13. The loudspeaker arrangement of claim 1 wherein the surface of the diaphragm is structured to manipulate sound waves emitted from the diaphragm towards the interior of the vehicle and/or towards the window glass.

14. The loudspeaker arrangement of claim 1, wherein the diaphragm is a multi-layer diaphragm comprising a clear damping layer positioned between two clear outer layers.

15. The loudspeaker arrangement of claim 1, wherein the carrier comprises a frame, the frame configured to support the diaphragm.

16. The loudspeaker arrangement of claim 15, wherein gaps are formed between the carrier and the frame when the diaphragm is supported by the frame.

17. The loudspeaker arrangement of claim 16, wherein sound directing ribs are provided between the carrier and the frame which extends from an inner perimeter of the carrier to the outer perimeter of the frame.

18. The loudspeaker arrangement of claim 1, further comprising a wireless communication component to allow communication between a transmitter of the vehicle and an actuator of the loudspeaker arrangement.

19. The loudspeaker arrangement of claim 1 wherein the diaphragm at least partially overlaps the window glass.

20. The loudspeaker arrangement of claim 19 wherein the carrier is configured to support the window glass.

21. The loudspeaker arrangement of claim 19 wherein the carrier is configured to be attached to a body-in-white structure of a vehicle.

22. The loudspeaker arrangement of claim 1 wherein a surface of the window glass facing the diaphragm is structured to manipulate sound waves emitted from the diaphragm towards the window glass.

23. A vehicle comprising the loudspeaker arrangement according to claim 1, wherein the diaphragm of the respective loudspeaker arrangement is arranged and/or shaped to generate sound waves having a center of propagation directed at individual areas within a vehicle cabin which are adjacent to different passenger head positions.

24. The loudspeaker arrangement of claim 1 wherein the moving window is a hinged window or a sliding window.

25. The loudspeaker arrangement of claim 1 wherein the space is disposed in front of an opening mechanism of the moving window to provide access to the opening mechanism.

* * * * *